(12) United States Patent
Lai

(10) Patent No.: US 11,490,496 B1
(45) Date of Patent: Nov. 1, 2022

(54) INTERACTIVE DISPLAY SYSTEM

(71) Applicant: POWER MOS ELECTRONICS LIMITED, Hongkong (CN)

(72) Inventor: Cheng-Chang Lai, Taipei (TW)

(73) Assignee: Power Mos Electronic Limited, Kowloon Honkong (CN)

( * ) Notice: Subject to any disclaimer, the term of this patent is extended or adjusted under 35 U.S.C. 154(b) by 0 days.

(21) Appl. No.: 17/470,202

(22) Filed: Sep. 9, 2021

(51) Int. Cl.
*H05B 45/20* (2020.01)
*H05B 47/19* (2020.01)
*G06F 3/0346* (2013.01)
*G09F 9/33* (2006.01)

(52) U.S. Cl.
CPC ........... *H05B 47/19* (2020.01); *G06F 3/0346* (2013.01); *G09F 9/33* (2013.01); *H05B 45/20* (2020.01)

(58) Field of Classification Search
CPC ...... H05B 45/20; H05B 47/19; H05B 47/125; H05B 47/155; H05B 47/175; Y02B 20/40; G06F 3/0346; G09F 9/33
See application file for complete search history.

(56) References Cited

U.S. PATENT DOCUMENTS

| 10,321,541 | B2 * | 6/2019 | Bora | F21V 31/00 |
|---|---|---|---|---|
| 2005/0264545 | A1 * | 12/2005 | Walker | G06F 3/0362 |
| | | | | 345/204 |
| 2005/0275626 | A1 * | 12/2005 | Mueller | H05B 47/19 |
| | | | | 345/156 |
| 2006/0230192 | A1 * | 10/2006 | Parry | G06F 3/04886 |
| | | | | 710/15 |
| 2008/0122792 | A1 * | 5/2008 | Izadi | G06F 3/04883 |
| | | | | 345/173 |
| 2011/0083106 | A1 * | 4/2011 | Hamagishi | G06F 3/04815 |
| | | | | 348/E13.021 |
| 2014/0118270 | A1 * | 5/2014 | Moses | G06F 1/1607 |
| | | | | 345/173 |
| 2017/0173453 | A1 * | 6/2017 | Huang | G06F 3/011 |
| 2017/0301283 | A1 * | 10/2017 | Liu | G09G 3/3233 |
| 2021/0276483 | A1 * | 9/2021 | Kang | B60Q 9/00 |

* cited by examiner

*Primary Examiner* — Haissa Philogene
(74) *Attorney, Agent, or Firm* — Rosenberg, Klein & Lee

(57) ABSTRACT

An interactive display system includes a display device and a user device. The display device includes a controlling unit and lighting units, and the controlling unit transmits a color signal to the lighting units. When the user device emits an active light signal to the lighting units, the lighting unit that receives the active light signal lights up according to the color signal. Namely, when the user uses the user device to emit the active light signal to the lighting units of the display device, the lighting units illuminated by the active light signal can light up. Therefore, the user can use the display device as a canvas, and the user can draw a picture or write a memo on the display device for interacting with the display device of the interactive display system.

8 Claims, 5 Drawing Sheets

INTERACTIVE DISPLAY SYSTEM

BACKGROUND OF THE INVENTION

1. Field of the Invention

The present invention relates to a display system, and more particularly an interactive display system.

2. Description of the Related Art

A conventional display device is used for displaying a video signal processed by a main controller of the display device. Namely, the conventional display device is just a display interface that cannot directly interact with a user. There is already a display device having a camera that cooperates with sensors to capture actions of the viewer. When the main controller of the display device receives signals from the camera and the sensors, the main controller converts the signals into an image corresponding to the user, and displays the image on a screen of the display device.

However, the display device having the camera can only display the image corresponding to the user, but the user still cannot interact with content displayed on the screen of the display device. Therefore, the conventional display device needs to be improved.

SUMMARY OF THE INVENTION

To overcome the aforementioned drawback, an interactive display system of the present invention can provide interactions between a user and a display device.

The interactive display system includes a display device and a user device.

The display device includes a memory unit, a controlling unit, and a plurality of lighting units. The memory unit stores a color signal. The controlling unit is electrically connected to the memory unit. The lighting units are electrically connected to the controlling unit, and the controlling unit transmits the color signal to the lighting units.

The user device includes an emitting unit. The emitting unit emits an active light signal. When the emitting unit emits the active light signal to at least one of the lighting units, the at least one of the lighting units that receives the active light signal lights up according to the color signal.

Since the lighting units an react with the active light signal, the user can use the user device with the emitting unit to interact with the display device. For example, when the user uses the emitting unit to emit the active light signal to the lighting units of the display device, the lighting units illuminated by the active light signal can light up. Namely, the user can use the display device as a canvas, and the user can draw a picture or write a memo on the display device. Therefore, the user can interact with the display device of the interactive display system of the present invention.

DETAILED DESCRIPTION OF THE INVENTION

Figure 1:
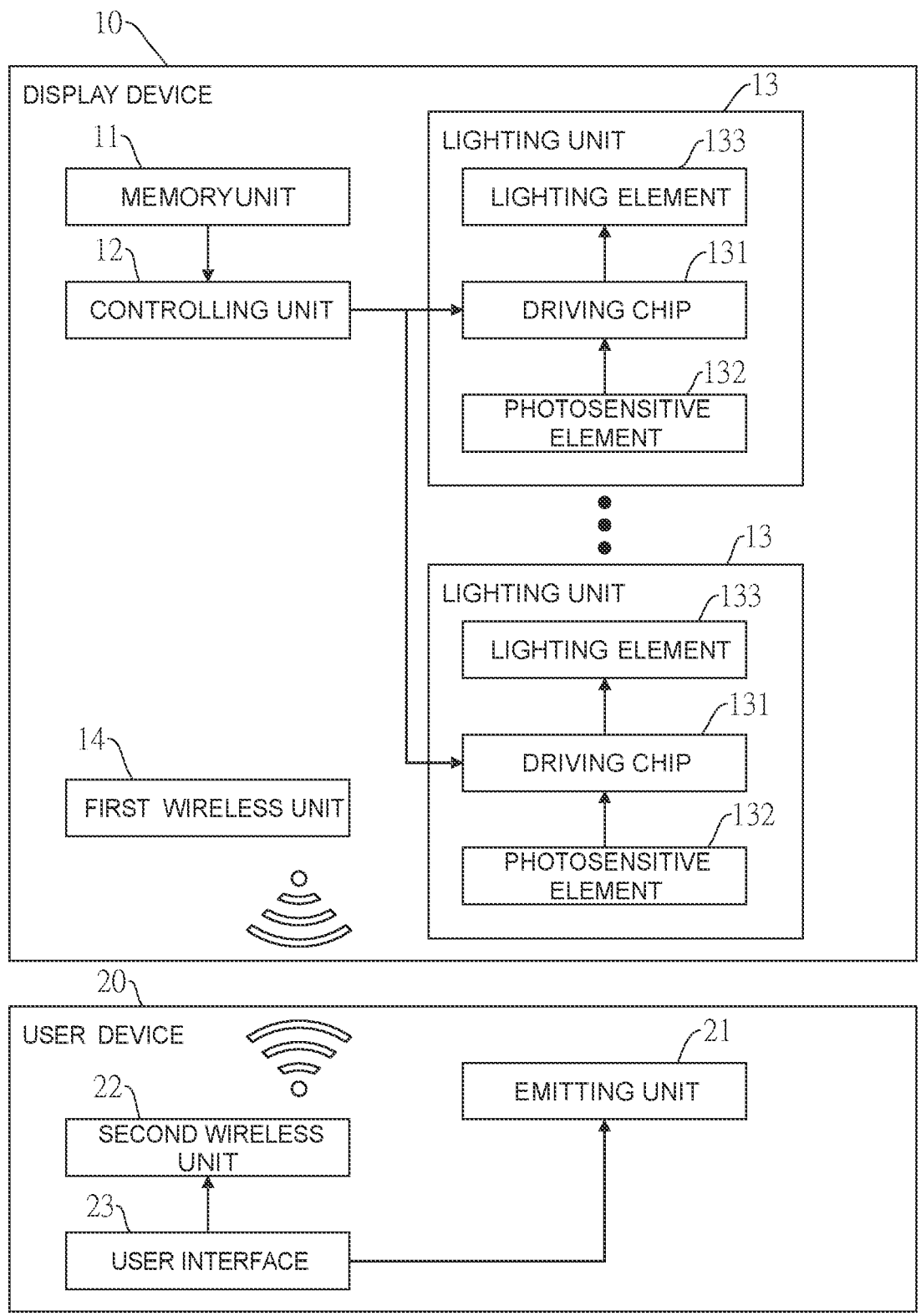
FIG. 1 is a block diagram of an interactive display system of the present invention.

With reference to FIG. 1, an interactive display system of the present invention includes a display device 10 and a user device 20. The display device 10 includes a memory unit 11, a controlling unit 12, and a plurality alighting units 13. The memory unit 11 stores a color signal. The controlling unit 12 is electrically connected to the memory unit 11. The lighting units 13 are electrically connected to the controlling unit 12, and the controlling unit 12 transmits the color signal to the lighting units 13.

The user device 20 includes an emitting unit 21. The emitting unit 21 emits an active light signal. When the emitting unit 21 emits the active light signal to at least one of the lighting units 13, the at least one of the lighting units 13 that receives the active light signal lights up according to the color signal.

Since the lighting units 13 can react with the active light signal, the user can use the user device 20 with the emitting unit 21 to interact with the display device 10. For example, when the user uses the emitting unit 21 to emit the active light signal to the lighting units of the display device 20, the lighting units 13 illuminated by the active light signal can light up. Namely, the user can use the display device 10 as a canvas, and the user can draw a picture or write a memo on the display device 10. Therefore, the user can interact with the display device 10 of the interactive display system of the present invention.

Figure 2:
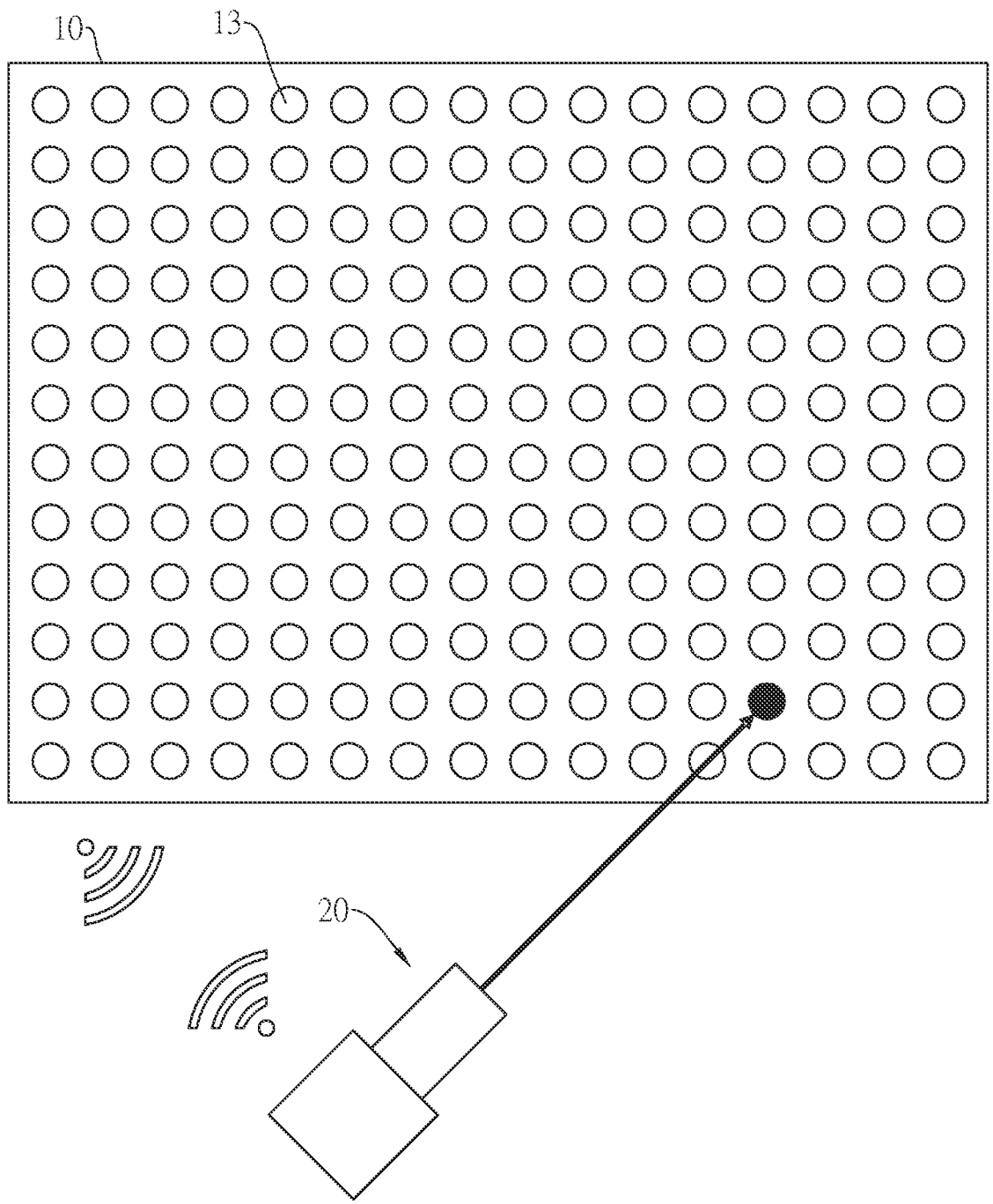
FIG. 2 is a schematic diagram of the interactive display system of the present invention.
Figure 3:
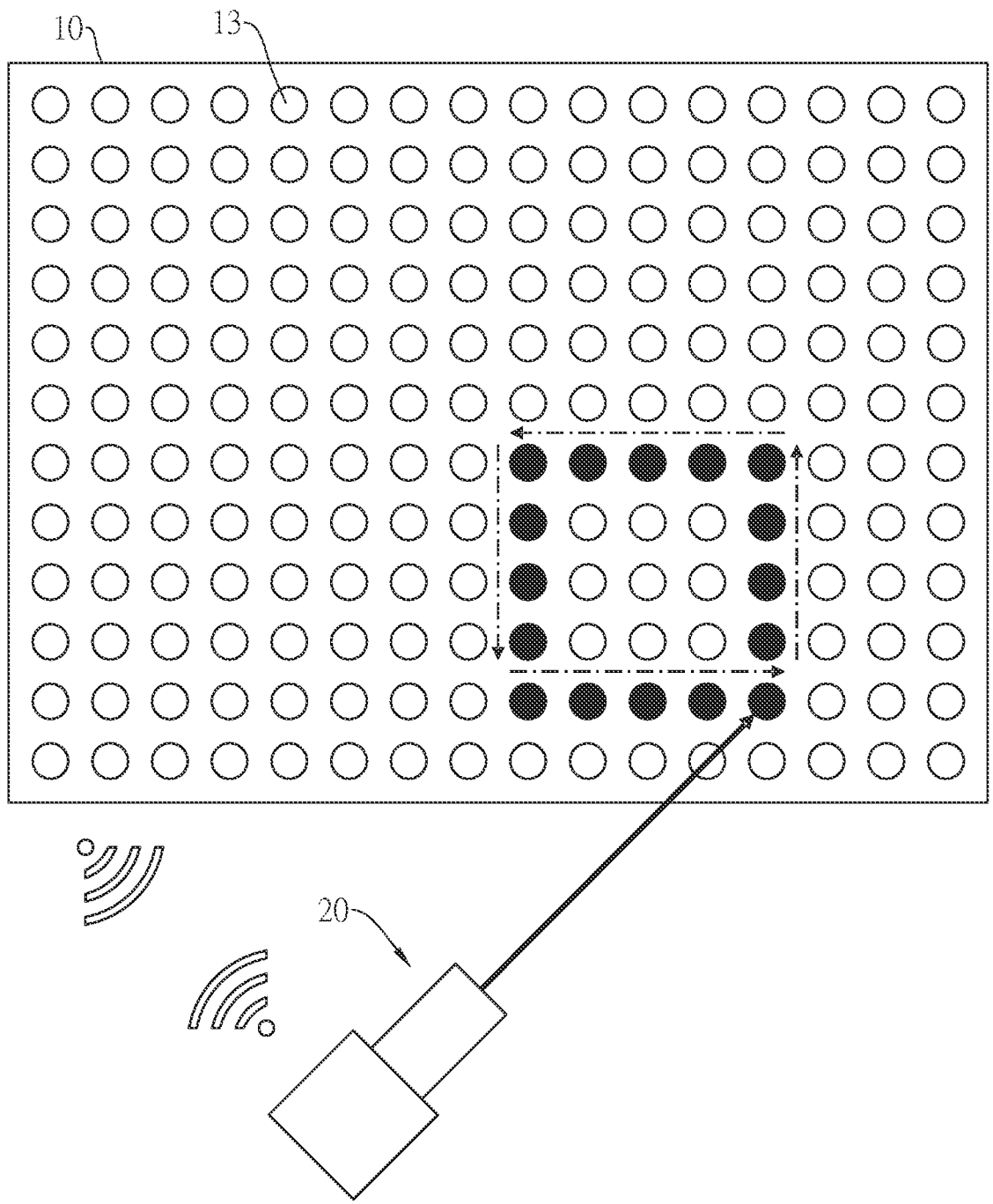
FIG. 3 is another schematic diagram of the interactive display system of the present invention.

With reference to FIGS. 2 and 3, for example, the user may use the user device 20 to point to at least one of the lighting units 13, and the emitting unit 21 emits the active light signal to the at least one of the lighting units 13. Then, the at least one of the lighting units 13 that receives the active light signal may light up according to the color signal.

Further, the user may use the emitting unit 21 of the user device 20 to draw a square on the display device 10, the lighting units 13 that receive the active light signal may light up, and the lighting units 13 that light up may form a square.

With reference to FIG. 1, each of the lighting units 13 includes a driving chip 131, a photosensitive element 132, and a lighting element 133.

The driving chip 131 is electrically connected to the controlling unit 12 to receive the color signal. The photosensitive element 132 is electrically connected to the driving chip 131, and senses the active light signal emitted by the emitting unit 21 of the user device 20. The lighting element 133 is electrically connected to the driving chip 131.

When the driving chip 131 detects that the photosensitive element 132 senses the active light signal, the driving chip 131 drives the lighting element 133 to light up according to the color signal.

Moreover, each of the driving chips 131 of the lighting units 13 has a unique address code, such that the controlling unit 12 can transmit signal to a specific lighting unit 13 according to the address code.

Figure 4:
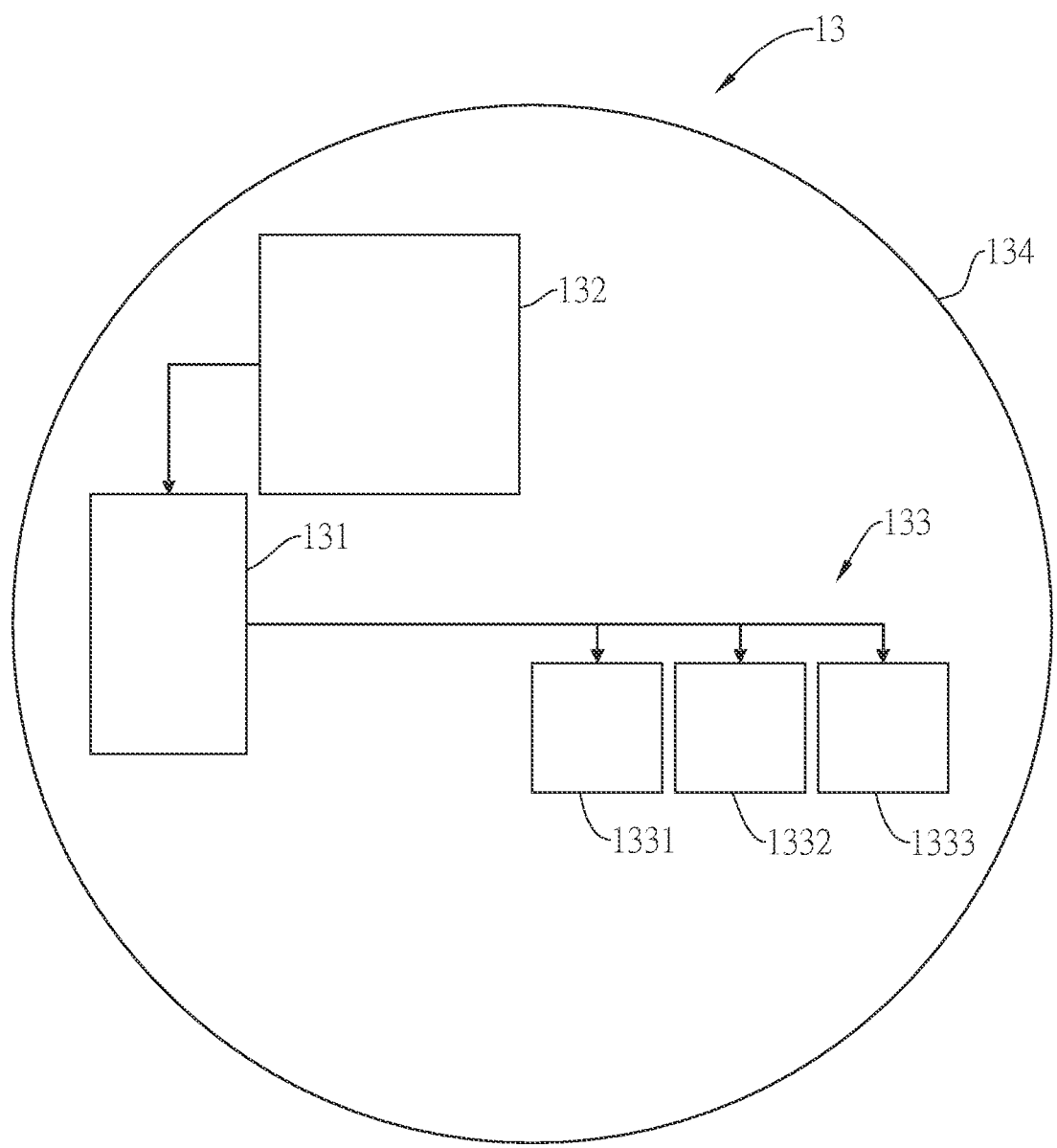
FIG. 4 is a top view of a lighting unit of a display device of the interactive display system of the present invention.
Figure 5:
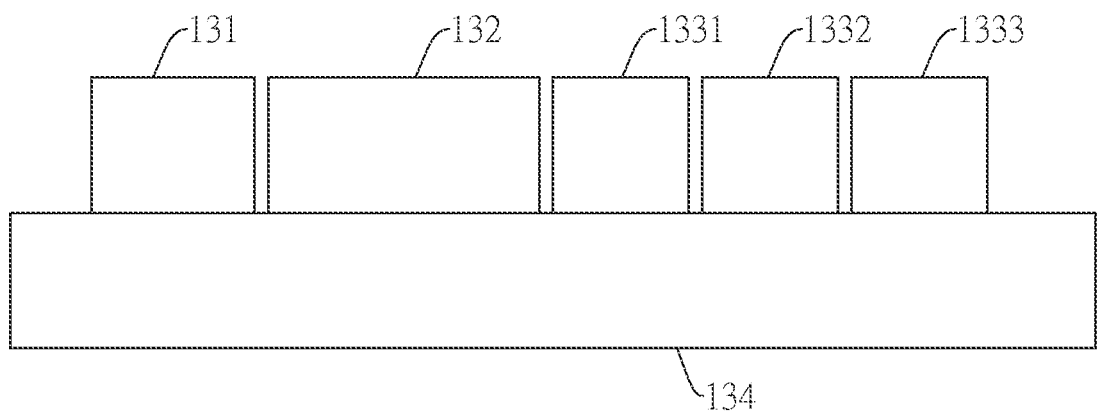
FIG. 5 is a side view of the lighting unit of the display device of the interactive display system of the present invention.

With reference to FIGS. 4 and 5, the lighting element 133 includes a red light-emitting diode (LED) chip 1331, a green LED chip 1332, and a blue LED chip 1333.

The red LED chip 1331, the green LED chip 1332, and the blue LED chip 1333 are electrically connected to the driving chip 131. The red LED chip 1331, the green LED chip 1332, and the blue LED chip 1333 are mounted on a substrate 1334.

Further, the color signal comprises a red signal, a green signal, and a blue signal.

When the driving chip 131 drives the lighting element 133 to light up according to the color signal, the driving chip 131 drives the red LED chip 1331 to light up according to the red signal, drives the green LED chip 1332 to light up according to the green signal, and drives the blue LED chip 1333 to light up according to the blue signal.

Namely, the color signal is a color code, and the lighting element 133 is a colorful lighting element. Therefore, the lighting element 133 can light up in any color according to the color signal.

With reference to FIGS. 1 and 2, the display device 10 further includes a first wireless unit 14. The first wireless unit 14 is electrically connected to the controlling unit 12.

The user device 20 further includes a second wireless unit 22 and a user interface 23.

The second wireless unit 22 is wirelessly connected to the first wireless unit 14. The user interface 23 is electrically connected to the second wireless unit 22, and generates a color update signal.

When the user interface 23 generates the color update signal, the second wireless unit 22 wirelessly transmits the color update signal to the first wireless unit 14.

When the controlling unit 12 receives the color update signal through the first wireless unit 14, the controlling unit 12 updates the color signal stored in the memory unit 11 according to the color update signal.

For example, the user interface 23 may include a color wheel, and the user may select a color from the color wheel. Then, the user interface 23 may generate the color update signal according to the color selected by the user, and transmit, the color update signal to the display device 10 for updating the color signal stored in the memory unit 11.

Namely, the lighting units 13 may light up when receiving the active light signal. A color of the lighting unit 13 that lights up corresponds to the color signal stored in the memory unit 11. If the lighting units 13 do not receive the active light signal, the lighting units 13 may not change a light state.

For instance, the lighting units 13 are lighting up in a red color, but the color signal stored in the memory unit 11 corresponds to a green color. If the lighting units 13 do not receive the active light signal, the lighting units 13 do not change to light up in the green color, and the lighting units 13 are still lighting in the red color. When the lighting units 13 receive the active light signal, the lighting units 13 light up according to the color signal stored in the memory unit 11. Namely, the color of the lighting units 13 will be changed from red to green.

Further, the user interface 23 generates a triggering signal. When the user interface 23 generates the triggering signal, the emitting unit 21 emits the active light signal.

For example, the user interface 23 may include a button. When the user presses the button, the user interface 23 generates the triggering signal, and transmits the triggering signal to the emitting unit 21. When the emitting unit 21 receives the triggering signal, the emitting unit 21 emits the active light signal. Therefore, the user can use the emitting unit 21 to draw on the display device 10.

In an embodiment, the photosensitive element 132 is a photoresistor, the emitting unit 21 of the user device 20 is a laser unit, and the lighting units 13 of the display device 10 are arranged in a matrix. Further the first wireless unit 14 and the second wireless unit 22 are WiFi units, Bluetooth units, radio frequency (RF) units, or infrared units. The lighting units 13 are electrically connected to the controlling unit 12 through a serial peripheral interface (SPI), a shift register interface, or a power line carry signal interface.

Moreover, the active light signal may have a specific frequency or wavelength, such that the active light signal is distinguished from ambient light source. Therefore, the active light signal may not be influenced by the ambient light source.

Even though numerous characteristics and advantages of the present invention have been set forth in the foregoing description, together with details of the structure and function of the invention, the disclosure is illustrative only.

Changes may be made in detail, especially in matters of shape, size, and arrangement of parts within the principles of the invention to the full extent indicated by the broad general meaning of the terms in which the appended claims are expressed.

What is claimed is:

1. An interactive display system, comprising:
    a display device, comprising:
        a memory unit, storing a color signal;
        a controlling unit, electrically connected to the memory unit;
        a plurality of lighting units, electrically connected to the controlling unit; wherein the controlling unit transmits the color signal to the lighting units;
    a user device, comprising:
        an emitting unit, emitting an active light signal; wherein when the emitting unit emits the active light signal to at least one of the lighting units, the at least one of the lighting units receiving the active light signal lights up according to the color signal.

2. The interactive display system as claimed in claim 1, wherein each of the lighting units comprises:
    a driving chip, electrically connected to the controlling unit, and receiving the color signal;
    a photosensitive element, electrically connected to the driving unit, and sensing the active light signal emitted by the emitting unit of the user device;
    a lighting element, electrically connected to the driving chip;
    wherein when the driving chip detects that the photosensitive element senses the active light signal, the driving chip drives the lighting element to light up according to the color signal.

3. The interactive display system as claimed in claim 2, wherein the lighting element comprises:
    a red light emitting diode (LED) chip, electrically connected to the driving chip,
    a green LED chip, electrically connected to the driving chip;
    a blue LED chip; electrically connected to the driving chip;
    wherein the color signal comprises a red signal, a green signal, and a blue signal;
    wherein the driving chip drives the red LED chip to light up according to the red signal, the driving chip drives the green LED chip to light up according to the green signal, and the driving chip drives the blue LED chip to light up according to the blue signal.

4. The interactive display system as claimed in claim 2, wherein the photosensitive element is a photoresistor.

5. The interactive display system as claimed in claim 1, wherein the display device further comprises:

a first wireless unit, electrically connected to the controlling unit;

wherein the user device further comprises:
   a second wireless unit, wirelessly connected to the first wireless unit; and
   a user interface, electrically connected to the second wireless unit, and generating a color update signal;

wherein when the user interface generates the color update signal, the second wireless unit wirelessly transmits the color update signal to the first wireless unit;

wherein when the controlling unit receives the color update signal through the first wireless unit, the controlling unit updates the color signal stored in the memory unit according to the color update signal.

6. The interactive display system as claimed in claim 1, wherein the user device further comprises:
   a user interface, electrically connecting to the emitting unit, and generating a triggering signal; and
   wherein when the user interface generates the triggering signal, the emitting unit emits the active light signal.

7. The interactive display system as claimed in claim 1, wherein the emitting unit is a laser unit.

8. The interactive display system as claimed in claim 1, wherein the lighting units of the display device are arranged in a matrix.

* * * * *